Patented Aug. 17, 1948

2,447,476

UNITED STATES PATENT OFFICE 2,447,476

RECOVERY OF FLUOSULFONIC ACID AND USE AS CONDENSING AGENT IN PRODUCTION OF DDT

Marshall Kulka, Guelph, Ontario, Canada, assignor to United States Rubber Company, New York, N. Y., a corporation of New Jersey No Drawing. Application August 13, 1947, Serial No. 768,485. In Canada May 17, 1947

9 Claims. (Cl. 260—649)

This invention relates to a method of recovering fluosulfonic acid from spent acid containing the same in admixture with sulfuric acid and hydrogen fluoride. In its most important aspect it relates to a method of recovering fluosulfonic acid which has become spent as a result of use as the condensing agent for chemical condensations which liberate water, particularly spent fluosulfonic acid formed in the manufacture of 2,2-bis(p-chlorophenyl) - 1,1,1 - trichloroethane by the condensation of monochlorobenzene with chloral using fluosulfonic acid as the condensing agent.

DDT (2,2-bis(p-chlorophenyl)-1,1,1-trichloroethane) is commonly prepared by reacting together chloral or chloral hydrate with monochlorobenzene. Since water is one of the products of the reaction, a strong condensing or dehydrating acid is used to pick up this water and favorably displace the equilibrium. For this purpose, strong sulfuric acid, or oleum, or a mixture of sulfuric acid and oleum, are used industrially. Chlorosulfonic acid and fluosulfonic acid are also used as acid condensing agents for the DDT synthesis which is conveniently represented by the following equation:

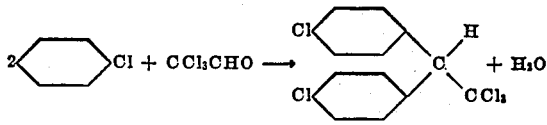

When fluosulfonic acid is employed as a condensing agent it acts as a dehydrating agent in accordance with the following equation:

During the reaction hydrogen fluoride is not evolved but remains in the spent acid. The presence of this hydrogen fluoride and of fluosulfonic acid in the spent acid creates a serious waste disposal problem in addition to representing a loss of valuable fluosulfonic acid. The principal object of the present invention is to recover fluosulfonic acid from this spent acid. Another object is to recover not only the fluosulfonic acid present as such in the spent acid but also to convert the free hydrogen fluoride in the spent acid to fluosulfonic acid and to recover the latter fluosulfonic acid. Another object is to eliminate the waste disposal problem presented by the spent fluosulfonic acid. My invention not only accomplishes the foregoing objects but also effects a major economic improvement in the synthesis of DDT with fluosulfonic acid as the condensing agent.

I have discovered a practical method of converting hydrogen fluoride content in the spent fluosulfonic acid to fluosulfonic acid and recovering this fluosulfonic acid together with the excess initial fluosulfonic acid in a purified state suitable for re-use as the condensing agent for further DDT formation.

My invention is a process of recovering fluosulfonic acid from the spent fluosulfonic acid (which comprises a mixture of fluosulfonic acid, sulfuric acid and hydrogen fluoride) by admixing sulfur trioxide with the spent acid and recovering the fluosulfonic acid content of the resulting mixture by distillation. My invention resides broadly in the discovery that fluosulfonic acid can be recovered from the spent acid by adding sulfur trioxide in any form to the spent acid followed by distillation of the resulting mixture and recovery of the fluosulfonic acid contained therein as the distillate.

The hydrogen fluoride content of the spent fluosulfonic acid is, in accordance with my invention, converted to fluosulfonic acid by sulfur trioxide, which may be employed either as such or as a solution in a suitable carrier, for example as oleum or fuming sulfuric acid. The reactions are as follows:

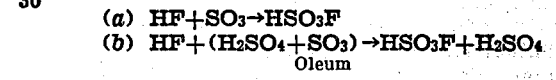

The spent fluosulfonic acid is simply mixed with the sulfur trioxide to give a uniform homogeneous mixture and the treated spent acid is distilled. Where sulfur trioxide is used as such, it may be added to the spent acid in any suitable form. For example, gaseous sulfur trioxide may be simply bubbled into the spent acid. Liquid sulfur trioxide may be commingled with the spent acid. However it is generally preferred to employ the sulfur trioxide in a suitable liquid carrier such as oleum which is commercially available and is readily handled in contrast to the difficulties of handling sulfur trioxide by itself.

The use of oleum as a source of sulfur trioxide for the practice of the present invention has the disadvantage that it adds to the sulfuric acid residue derived upon distillation of the resulting mixture. However this objection is often outweighed by the convenience and facility of handling of sulfur trioxide in the form of oleum.

The amount of sulfur trioxide admixed with the spent fluosulfonic acid may vary widely depending upon many factors including the proportion of free hydrogen fluoride in the spent acid. It is often preferred to employ at least enough sulfur trioxide to combine chemically with all of the free hydrogen fluoride present in the spent acid. This means that in order to secure maximum recovery of fluosulfonic acid the amount of added free sulfur trioxide should be at least stoichiometrically equivalent to the free hydrogen fluoride in the spent acid. Employment of a great excess of sulfur trioxide above the stoichiometrical equivalent of the free hydrogen fluoride is undesirable because this excess sulfur trioxide is lost upon distillation. In general I prefer to employ free sulfur trioxide in an amount ranging from 0.9 to 1.1 mols of $SO_3$ per mol of free HF in the spent acid. Still more preferably I employ between 1.0 and 1.1 mols of free $SO_3$ per mol of free HF.

The addition of the sulfur trioxide may be accompanied by agitation in order to promote the formation of a homogeneous mixture. The added free sulfur trioxide reacts with the free hydrogen fluoride almost instantaneously. The addition may be carried out at any suitable temperature, the use of ordinary room temperature generally being preferred. Since the reaction between the added sulfur trioxide and the free hydrogen fluoride evolves heat, it may be desirable or necessary to cool in any suitable manner during the addition and admixture of the sulfur trioxide. As will be obvious to those skilled in the art, corrosion-resistant equipment should be used for carrying out the admixture and the subsequent distillation step.

As soon as the sulfur trioxide has been intimately commingled with the spent fluosulfonic acid, the treated spent acid may be distilled. My invention is based on the discovery that the resulting mixture can be distilled and fluosulfonic acid in substantially pure form can be recovered as the distillate. The distillation may be carried out in any manner known to those skilled in the art. I may employ either a simple pot still equipped with a condenser, or a fractional distillation column equipped with packing or bubble plates for promoting the desired rectification and stripping.

It is preferable to distill the treated spent acid under reduced pressure in order to bring the distillation temperature to a convenient operating range. For example a bath or kettle temperature of 150° C. is sufficient to carry out the distillation of the fluosulfonic acid rapidly at from 10 to 20 m.m. pressure.

By carrying out the distillation under reduced pressure such that the fluosulfonic acid is not subjected to a temperature above 150° C., decomposition of the fluosulfonic acid is prevented. Ordinarily it is preferable to carry out the distillation at a pressure of not over 30 millimeters of mercury absolute.

The distillation resolves the treated spent acid mixture into three separate fractions, namely:

(1) A non-condensable gaseous fraction containing any excess sulfur trioxide together with other non-condensable gases present in the mixture such as hydrogen chloride derived from by-products of the DDT reaction remaining in the spent acid, possibly sulfur dioxide derived by decomposition or side reactions, and the like. This non-condensable gaseous fraction comes overhead first and is usually disposed of through the vacuum source. Where a conventional fractional distillation column is employed for conducting the distillation step, the non-condensable fraction separates from the fluosulfonic acid after the condenser operating on the overhead vapors. This non-condensable gas may be withdrawn from the condensate accumulator. Generally it will be preferred to apply the vacuum to the vapor space in the condensate accumulator and thus to discharge the non-condensable gas through the vacuum source which may be a vacuum pump or other means of pulling the desired vacuum.

(2) A fraction of substantially pure fluosulfonic acid boiling at from 95-150° C. at 10-20 mm. pressure.

(3) A non-volatile fraction comprising the residual material, namely sulfuric acid and by-products of the DDT reaction, for example p-chlorobenzenesulfonic acid, bis-p-chlorophenyl sulfone, etc.

The process of the present invention may be operated either in a batch-wise fashion or in a continuous manner, the latter being preferred. Continuous operation is conveniently effected by simply continuously admixing the sulfur trioxide with the spent acid and continuously running the resulting mixture into a continuously operated distillation unit.

The spent fluosulfonic acid layer is generally derived from the reaction mixture whereby DDT is made by simply allowing separation of this reaction mixture by gravity into a clear brown lower acid layer and an upper organics layer containing the DDT. The spent acid may contain sulfuric acid, free hydrogen fluoride and unchanged fluosulfonic acid, together with small amounts of by-products. The proportions of hydrogen fluoride and sulfuric acid contained in the spent acid will depend upon the extent to which spending thereof has occurred. It will be understood that generally spending of the fluosulfonic acid must be limited since otherwise the DDT reaction is slowed up to an objectionable extent. Generally speaking the spent fluosulfonic acid treated in accordance with the present invention will contain from 30 to 70% of fluosulfonic acid, from 5 to 15% of hydrogen fluoride and from 15 to 45% of sulfuric acid, these percentages being by weight. The spent acid will usually also contain from 5 to 20% of impurities, such as side reaction products of the DDT process. It will be understood that the spending of the fluosulfonic acid produces equimolecular proportions of hydrogen fluoride and sulfuric acid, in accordance with the equation given above. This means that the percentage of sulfuric acid in the spent acid will usually be from 3 to 4.9 times the percentage of hydrogen fluoride.

Following are specific examples of the practice of my invention:

*Example 1*

Spent fluosulfonic acid derived from the preparation of DDT by the condensation of monochlorobenzene with chloral with fluosulfonic acid as the condensing agent had the following approximate analysis, the percentages being by weight:

| | Per cent |
|---|---|
| $HSO_3F$ | 44 |
| HF | 10 |
| $H_2SO_4$ | 31 |
| Side reaction products | 15 |

To 114 parts of the spent acid was added 40 parts of sulfur trioxide. The addition was effected by simply bubbling gaseous sulfur trioxide into the spent acid at ordinary atmospheric pressure and temperature. The resulting solution was distilled under 12 millimeters pressure. The bath temperature was maintained at 140–150° C.

The distillate, or recovered fluosulfonic acid, amounted to 83.5 parts giving a 77.8% recovery of available fluosulfonic acid including both the fluosulfonic acid in the original spent acid and the fluosulfonic acid derived by reaction of the added sulfur trioxide with the hydrogen fluoride in the spent acid. The residue from the distillation amounted to 70 parts or 61.3% of the original spent acid.

*Example 2*

To 150 parts of the same spent acid as was treated in accordance with Example 1, there was added 88 parts of 60% oleum ($H_2SO_4$ plus 60% $SO_3$), and the resulting solution was distilled under 16 mm. pressure. The bath temperature, which was initially 95° C., increased to 150° C. during the distillation. The distillate or recovered fluosulfonic acid amounted to 114 parts giving an 80.9% recovery of available fluosulfonic acid. The residue was 106 parts or 70.8% of the original spent acid.

It will of course be understood that I am not limited to spent acid of the analysis given above as this analysis may vary considerably depending upon many factors including times, temperatures, ratios of materials, etc., which may all be varied but will still yield a spent fluosulfonic acid recoverable by my method. I believe that I am first to provide a process wherein fluosulfonic acid is decomposed during the condensation reaction by water liberated by the reaction and is then recovered for re-use in the reaction by the use of sulfur trioxide. The fluosulfonic acid can be recovered in exceptionally good yields by my process. The process is applicable to recovering the fluosulfonic acid repeatedly and indefinitely. Thus for example DDT may be prepared with fluosulfonic acid, the spent acid treated in accordance with the present invention and the recovered fluosulfonic acid used again in the condensing reaction and the spent acid from the second use again treated with sulfur trioxide and re-used, this sequence being kept up indefinitely.

I am not limited to the type of distillation used to effect the recovery of the fluosulfonic acid in accordance with the present invention since various methods for this unit operation may be employed including both batch and continuous distillation. In the continuous distillation, it may be preferred to run the treated spent fluosulfonic acid into the column and effect a flash distillation of the fluosulfonic acid as the distillate while the sulfuric acid residue drops to the still pot and is removed.

All percentages and parts referred to herein are by weight.

From the foregoing description many advantages of the process of the present invention will be apparent to those skilled in the art. Among those advantages are the provision of a simple and commercially feasible method of recovering fluosulfonic acid from spent fluosulfonic acid in high yields. Another advantage is that the equipment requirements for the process of the present invention are simple, it being necessary only to use corrosion-resistant mixing and distilling equipment. Such equipment may conveniently be made of aluminum or aluminum alloys, or of corrosion-resistant steel such as stainless steel. The method of the present invention is particularly advantageous when applied to the manufacture of DDT with fluosulfonic acid as the condensing agent. When fluosulfonic acid is employed to effect the manufacture of DDT, the process is not commercially feasible if the spent acid has to be discarded. However, by applying the process of the present invention to recover the fluosulfonic acid the use of fluosulfonic acid as the condensing agent for DDT manufacture assumes commercial importance. Another advantage of the present invention is that it effects recovery not only of the unspent fluosulfonic acid contained in the spent acid but also of fluosulfonic acid formed from the free hydrogen fluoride in the spent acid. Many other advantages of my invention will be apparent to those skilled in the art.

Having thus described my invention, what I claim and desire to protect by Letters Patent is:

1. The process of recovering fluosulfonic acid from spent acid comprising the same in admixture with sulfuric acid and hydrogen fluoride which comprises admixing sulfur trioxide with said spent acid, distilling the resulting mixture and recovering fluosulfonic acid as the distillate.

2. The process of recovering fluosulfonic acid from spent acid which has been formed in the manufacture of 2,2-bis(p-chlorophenyl)-1,1,1-trichloroethane by reaction of chloral with monochlorobenzene with fluosulfonic acid as the condensing agent which spent acid comprises sulfuric acid, fluosulfonic acid and hydrogen fluoride, which comprises admixing sulfur trioxide with said spent acid, distilling the resulting mixture and recovering fluosulfonic acid as the distillate.

3. The process of recovering fluosulfonic acid from spent acid comprising the same in admixture with sulfuric acid and hydrogen fluoride which comprises admixing a material consisting essentially of sulfur trioxide with said spent acid, distilling the resulting mixture under reduced pressure and recovering fluosulfonic acid as the distillate.

4. The process of claim 3 wherein the amount of said sulfur trioxide is at least stoichiometrically equivalent to the free hydrogen fluoride in the spent acid.

5. The process of recovering fluosulfonic acid from spent acid containing the same in admixture with sulfuric acid and hydrogen fluoride which comprises admixing sulfur trioxide with said spent acid, distilling the resulting mixture at a pressure of not over 30 millimeters of mercury absolute and recovering fluosulfonic acid as the distillate.

6. The process of recovering fluosulfonic acid from spent acid comprising the same in admixture with sulfuric acid and hydrogen fluoride which comprises admixing sulfur trioxide with said spent acid, distilling the resulting mixture under reduced pressure and thereby separating same into three fractions, namely a first fraction of non-condensable gas, a second fraction consisting essentially of fluosulfonic acid including both the fluosulfonic acid present in the spent acid and the fluosulfonic acid formed by reaction of the added sulfur trioxide with the free hydrogen fluoride in said spent acid, and a residual non-volatile fraction.

7. The process of recovering fluosulfonic acid from spent acid comprising the same in admixture with sulfuric acid and hydrogen fluoride which comprises admixing a material consisting of fuming sulfuric acid with said spent acid, distilling the resulting mixture under reduced pressure and recovering fluosulfonic acid as the distillate.

8. A process which comprises effecting a chemical condensation which liberates water with fluosulfonic acid as the condensing agent, the liberated water decomposing the fluosulfonic acid and thereby spending same, withdrawing the spent fluosulfonic acid, admixing sulfur trioxide with the spent fluosulfonic acid, distilling the resulting mixture and recovering fluosulfonic acid as the distillate, and returning the thus-recovered fluosulfonic acid to re-use in said condensation.

9. A process of producing 2,2-bis(p-chlorophenyl)-1,1,1-trichloroethane which comprises condensing monochlorobenzene with chloral with fluosulfonic acid as the condensing agent, the water liberated by the condensation decomposing the fluosulfonic acid and thereby spending same, withdrawing the spent fluosulfonic acid, admixing sulfur trioxide with the spent fluosulfonic acid, distilling the resulting mixture and recovering fluosulfonic acid as the distillate, and returning the thus-recovered fluosulfonic acid to re-use in said condensation.

MARSHALL KULKA.